United States Patent [19]

Sheldon

[11] 4,355,502

[45] Oct. 26, 1982

[54] POLYMERIC CHAIN LINK WITH INTEGRAL TELESCOPING BARREL

[75] Inventor: Jerome F. Sheldon, Milwaukee, Wis.

[73] Assignee: Rexnord Inc., Milwaukee, Wis.

[21] Appl. No.: 219,687

[22] Filed: Dec. 24, 1980

[51] Int. Cl.³ ............................................ F16G 13/06
[52] U.S. Cl. ....................................... 59/84; 474/207; 474/234
[58] Field of Search ................... 59/84, 78, 82, 90, 80, 59/79 R, 5, 8; 474/234, 207, 232, 233, 234, 226, 227, 228, 230

[56] References Cited

U.S. PATENT DOCUMENTS

| | | | |
|---|---|---|---|
| 846,803 | 3/1907 | Mills | 474/228 |
| 1,587,054 | 6/1926 | Weiss | 474/231 |
| 1,691,680 | 11/1928 | Thompson | 474/226 |
| 1,734,960 | 11/1929 | Brockschmidt | 474/91 |
| 2,568,650 | 9/1951 | McIntosh | 474/227 |
| 4,220,052 | 9/1980 | Sheldon | 59/84 |
| 4,250,764 | 2/1981 | Grant | 474/207 |
| 4,271,663 | 6/1981 | Templin | 59/84 |
| 4,272,952 | 6/1981 | Graham | 59/84 |
| 4,276,040 | 6/1981 | Petershack | 59/85 |

Primary Examiner—Gene Crosby

[57] ABSTRACT

A polymeric chain link including two sidebars and a barrel connecting the sidebars. The barrel is comprised of a male barrel portion and a female barrel portion, each barrel portion being an integral extension of one of the sidebars. The male barrel portion fits inside the female barrel portion, and the inner mating surface of the female barrel portion cooperates with the outer mating surface of the male barrel portion to couple the two portions, mechanically locking them together.

10 Claims, 6 Drawing Figures

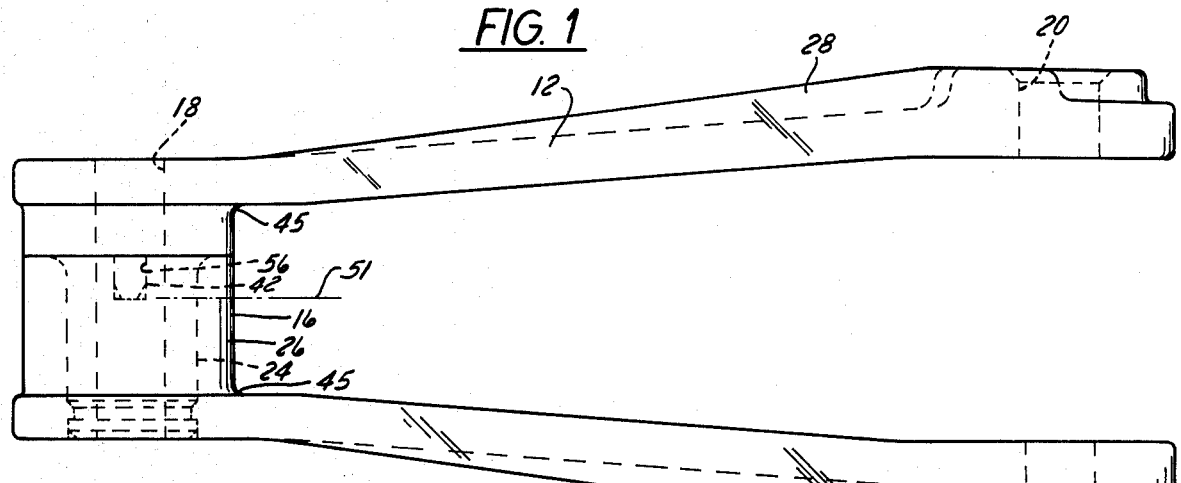
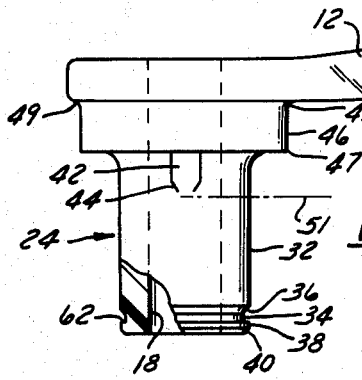
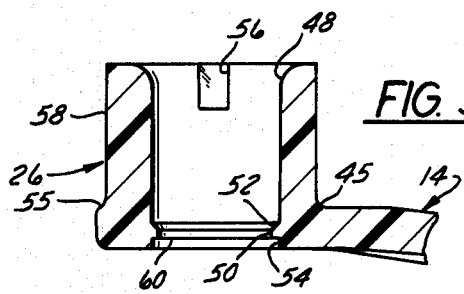
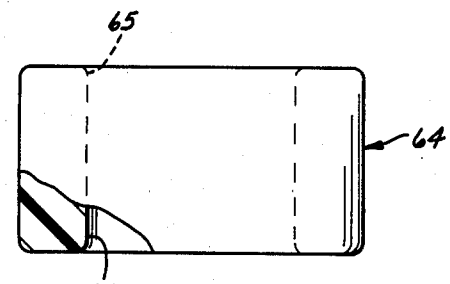
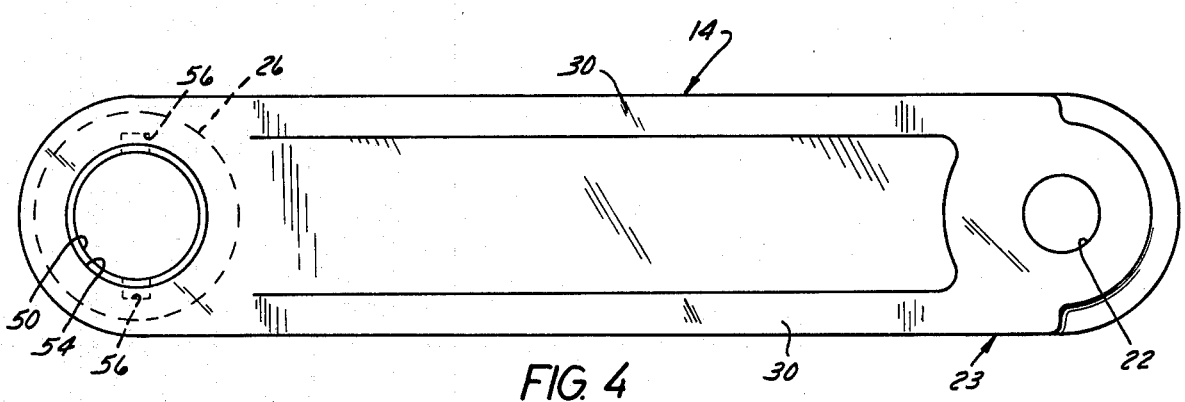

POLYMERIC CHAIN LINK WITH INTEGRAL TELESCOPING BARREL

BACKGROUND OF THE INVENTION

The present invention relates to a chain link, and, more particularly, to a polymeric chain link having a telescoping barrel.

The use of polymeric materials in power transmission and conveyor chain is a relatively recent development. Such chain has been found to be particularly suited for uses in which the features of light weight, low coefficient of friction and the ability to withstand corrosive environments are needed, such as in the food industry.

Metal chain links, which are adapted to be used with a roller, have existed for some time. For example, U.S. Pat. Nos. 1,734,960, Nov. 12, 1929; 673,748, May 7, 1901; and 1,587,054, June 1, 1926 all disclose pintle-type links made of metal in which the barrel portion of the links is made in two parts, so that a roller may be slipped onto the outside of the barrel prior to assembly of the links. Such metal chain has the disadvantage of being heavy and of corroding in environments such as corrosive solutions and high humidity. It also generally requires lubrication, whereas, if the appropriate polymeric materials were used, lubrication would not be necessary. The methods of coupling the barrel portions used in those patents are not particularly suited for use with a polymeric chain.

A primary object of the present invention is to provide a standard, polymeric link which can be used in power transmission and conveyor chain, and which can be used either with or without a roller mounted over the barrel of the link.

SUMMARY OF THE INVENTION

The present invention comprises a polymeric chain link which is made in two parts. Each part includes a sidebar with an integral barrel portion projecting inward from at least one end of the sidebar. The male barrel portion of one sidebar fits inside the female barrel portion of the other sidebar, and the surfaces of the male and female barrel portions are contoured such that when the male barrel portion is inserted into the female barrel portion with some force applied to it, the outer mating surface of the male barrel portion couples with the inner mating surface of the female barrel portion, such that the barrel portions mechanically lock together, forming a barrel for the link. A roller may be placed over the female barrel portion prior to coupling the barrel portions, or the link may be assembled without a roller, thereby providing a standard, polymeric link which can be used either with or without a roller.

For a more detailed explanation of the invention, reference should be made to the drawings and description in which:

BRIEF DESCRIPTION OF THE DRAWINGS

FIG. 1 is a top view of a preferred embodiment of the present invention, showing a pintle-type link with internal and hidden features shown by phantom lines.

FIG. 2 is a partial cross-sectional top view of the male barrel portion, with part of the sidebar broken away, with the bore through the barrel shown by phantom lines.

FIG. 3 is a cross-sectional top view of the female barrel portion and its sidebar, with part of the sidebar broken away.

FIG. 4 is a side view of the female barrel portion and its sidebar.

FIG. 5 is a partial cross-sectional top view of the roller, with internal features shown by phantom lines.

DETAILED DESCRIPTION OF THE PREFERRED EMBODIMENT

Figure 6:
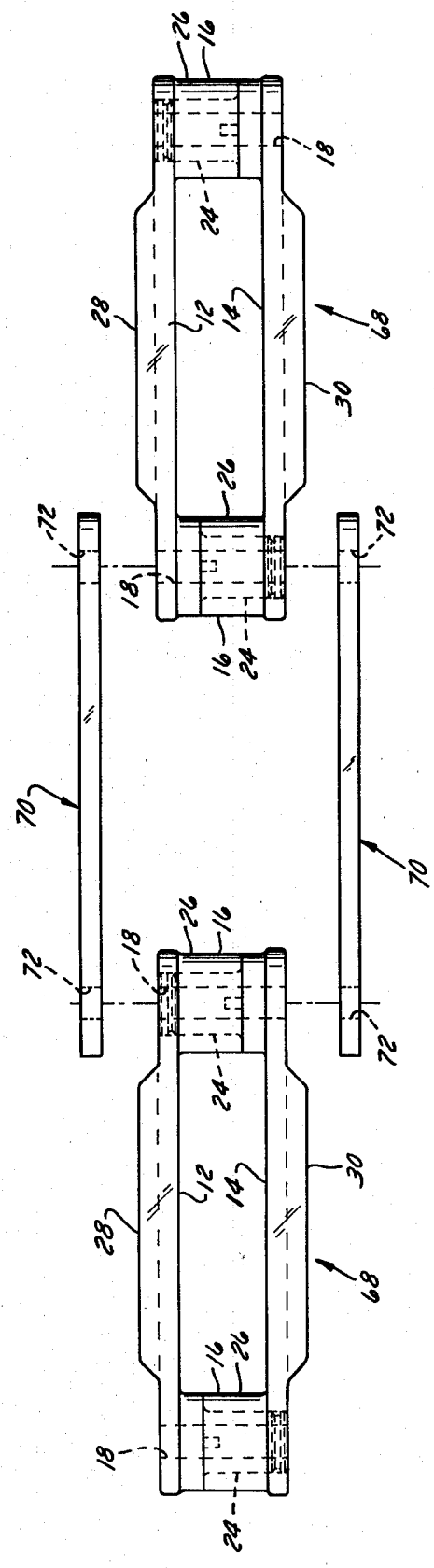
FIG. 6 is a top view of a second preferred embodiment of interconnected block links and pin links constructed in accordance with the principles of the present invention, with internal and hidden features shown by phantom lines.

As seen in FIG. 1, one embodiment of the present invention is a pintle-type link 10 which is comprised of two sidebars 12, 14 and barrel 16 between the sidebars 12, 14. The barrel 16 is in the shape of a hollow cylinder, as it has a bore 18 along its axis. There are also bores 20, 22 through the sidebars 12, 14 at the pin end 23 of the sidebars 12, 14. The midpoint of barrel 16 is at point 51.

In order to construct a chain using several of the links, the barrel 16 of one link is placed between the pin end 23 of the sidears 12, 14 of the next adjacent link so that the bore 18 through the barrel 16 of the first link is aligned with the bores 20, 22 through the sidebars 12, 14, and a pin is inserted through the bores 20, 18, 22 to hold the two links together. The type of pin described in U.S. Pat. No. 4,220,052, hereby incorporated by reference, is preferred for use with the present invention, although other pins may also be used. This is repeated, adding one link after another to form a chain.

FIG. 1 further shows that the barrel 16 is made up of two parts, a male barrel portion 24 and a female barrel portion 26, which will be described in detail later. Wear shows 28, 30 are also illustrated in FIG. 1. These wear shoes 28, 30 provide a wear surface when the link is not used with a roller, as well as acting as strengthening members.

FIG. 2 shows the male barrel portion 24 more clearly. It can be seen that the male barrel portion 24 is an integral part of sidebar 12 and extends inward from sidebar 12. The outer mating surface 32 of male barrel portion 24 has an annular surface portion of small outer diameter 34, which is bounded on both sides by surface portions of larger diameter 36, 38.

There is a sloping surface portion 40 on the outer mating surface 32 to facilitate insertion of the male barrel portion 24 into the female barrel portion 26. The outer mating surface 32 also has a longitudinal tab 42, with a tapered lead-in edge 44. Also shown at the barrel end of sidebar 12 is a roller mounting surface 46. The edge 47 of roller mounting surface 46 is located away from the critical stress points at point 49 where barrel 16 meets sidebar 12 and at midpoint 51. Corner 45 is shown where barrel 16 meets sidebar 12.

FIG. 3 shows the female barrel portion 26 more clearly. The female barrel portion 26 is an integral part of sidebar 14 and extends inward from sidebar 14. The inner mating surface 48 of female barrel portion 26 has an annular surface portion of small internal diameter 50, which is bounded on both sides by surface portions of larger diameter 52, 54. Annular surface portion 50 is located away from critical stress points at midpoint 51 and at point 55, where barrel 16 meets sidebar 14. Corner 45 is shown where barrel 16 meets sidebar 14.

Surface portion 52 slopes to facilitate insertion of the male barrel portion into the female barrel portion. On the inner mating surface 48 is a longitudinal slot 56. The outside surface of the female barrel portion 26 is also a roller mounting surface 58.

In order to couple the male and female barrel portions 24, 26, the male barrel portion 24 is inserted into the female barrel portion 26. The male barrel portion 24 cannot be completely inserted unless tab 42 is aligned with slot 56. This ensures that sidebars 12, 14 will be properly aligned when coupling occurs and prevents sidebars 12, 14 from rotating relative to each other after coupling. The tapered lead-in edge 44 of tab 42 facilitates insertion of tab 42 into slot 56. As the male barrel portion 24 is pushed further into the female barrel portion 26, surface 40 contacts surface 52. Surfaces 40, 52 are sloping and act as ramps, aiding in the gradual elastic deformation which is required in order for surface 38 to move past surface 50. A polymeric material having the necessary elastic properties is used to make the barrel portions so that they can be coupled in this manner. Once surface 38 has moved past surface 50, most of the compression forces are released, and the surfaces return almost to their original shape. There is, however, a slight interference fit between the annular surface portions of small diameter 34, 50, such that a certain amount of compression force remains, giving integrity to the barrel so formed. It is to be noted that, once the barrel portions 24, 26 are coupled, relative movement between the portions is restrained.

Roller mounting surface 46 prevents the male barrel portion 24 from being further inserted into the female barrel portion 26, and flat surfaces 60, 62 on the female barrel portion 26 and male barrel portion 24, respectively, retain the male barrel portion 24 inside of the female barrel portion 26.

FIG. 4 is a side view of sidebar 14, showing the wear shoe 30, bore 22 through sidebar 14 at the pin end 23, female barrel portion 26, and slots 56.

FIG. 5 shows roller 64 which is adapted to be mounted over roller mounting surfaces 46, 58. The inside surface 66 of roller 64 is shaped to fit smoothly over roller mounting surfaces 46, 58 when the male and female barrel portions 24, 26 are coupled, with mating corner radii to prevent roller-barrel cutting. The corner radius of corner 65 of roller 64 is generous in size and is larger than corner radius of corner 45 so as not to interfere with barrel 16.

In order to mount the roller 64 over the barrel 16, roller 64 is placed over roller mounting surface 58 on female barrel portion 26 prior to coupling male and female barrel portions 24, 26.

Link 10 may be used with or without roller 64, as wear shoes 28, 30 serve as contact surfaces when no roller is present.

FIG. 6 shows block-type links 68, which are a second embodiment of the invention. Block-type link 68 is made up of two sidebars 12, 14 with wear shoes 28, 30 as was the pintle-type link 10 shown in FIG. 1. However, unlike the pintle-type link 10, block-type link 68 when assembled, has two barrels 16. Both sidebars 12, 14 have a male barrel portion 24 and a female barrel portion 26 at their ends. These barrel portions 24, 26 are the same as the barrel portions 24, 26 shown in FIG. 1, with the only difference being that in the block-type link 68 each sidebar has two barrel portions rather than just one. Again, roller 64 could be placed over each barrel 16 prior to mating the male and female barrel portions 24, 26. It is not necessary that each sidebar have both a male and female barrel portion as shown here. Instead, one sidebar could have two male barrel portions and the other two female barrel portions. However, if the sidebars are made as shown in FIG. 6, only one mold is required, because the sidebars are identical. In order to form a chain using block links 68, a second type of link called a pin link 70 is used. The pin links 70 have a bore 72 at each end. The bore 72 through the pin links is aligned with the bore 18 through the barrel 16, and a pin is inserted through two pin links 70 and one barrel 16. This is done on each end of the pin links, thereby attaching two block-type links together. This can be done repeatedly to form a chain.

There is thus provided a non-metallic chain link that is easily assembled and may be used with or without a roller, resulting in a standardized link for both applications.

It should be apparent to those skilled in the art that modifications can be made without departing from the scope of the invention as defined in the following claims.

What is claimed is:

1. A polymeric chain link, comprising:
   first and second sidebars, each of said sidebars having a bore through both ends; and
   a hollow cylindrical barrel connected to one end of said first sidebar and to one end of said second sidebar, said barrel comprising:
   a. a male barrel portion integral with said first sidebar and projecting inward from said first sidebar at one end, said male barrel portion including an outer mating surface in which an annular surface portion of relatively small outer diameter is bounded on both sides by surface portions of larger diameter; and
   b. a female barrel portion integral with said second sidebar and projecting inward from said second sidebar at one end, said female barrel portion including an inner mating surface in which an annular surface portion of relatively small internal diameter is bounded on both sides by surface portions of larger diameter, said inner mating surface being complementary in shape to said outer mating surface, such that said barrel portions are adapted to be coupled by inserting said male barrel portion into said female barrel portion until said annular surface portion of small internal diameter on said female barrel portion fits into said annular surface portion of small outer diameter on said male barrel portion, whereby said barrel portions are mechanically locked together, forming said barrel.

2. The link recited in claim 1, further comprising: a sloping surface portion on said mating surfaces, providing a ramp for ease in inserting said male barrel portion into said female barrel portion.

3. The link recited in claim 2, wherein the internal dimensions of said inner mating surface when not coupled are slightly smaller than the corresponding outer dimensions of said outer mating surface, whereby the coupling of said male and female barrel portions results in an interference fit.

4. The link recited in claim 3, further comprising:
   a longitudinal slot in one of said surfaces; and
   a complementary longitudinal tab on the other of said surfaces, said tab being adapted to fit in said slot, whereby said sidebars must be properly aligned with said tab in said slot, in order for said male and female barrel portions to be coupled.

5. The link recited in claim 4, wherein said tab has a tapered leading edge.

6. The link recited in claim 5, further comprising wear shoes on said sidebars.

7. The link recited in claim 6, further comprising a roller mounted on said barrel.

8. The link recited in claim 7, wherein said sidebars and barrel form a pintle-type link having a barrel end and a pin end, whereby said barrel of one link may be located between said sidebars at said pin end of an adjacent link and a pin may be inserted through said bores at said pin end and through said barrel to connect said links.

9. The link recited in claim 7, wherein said barrel portions project inward from both sidebars at both ends, whereby said barrel portions may be mated to form a block-type link having two barrels.

10. The link recited in claim 9, wherein a male barrel portion projects from one end of each sidebar and a female barrel portion projects from the other end of each sidebar.

* * * * *